E. A. CHAMEROY.
Regulators to Protect Pipes from Percussion.
No. 126,444.
Patented May 7, 1872.
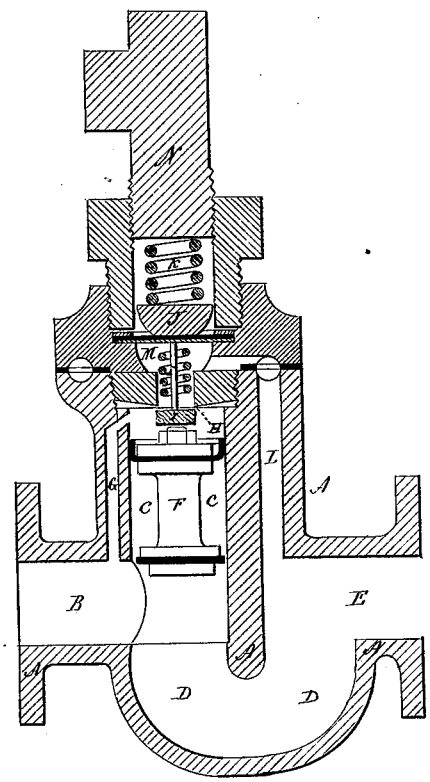
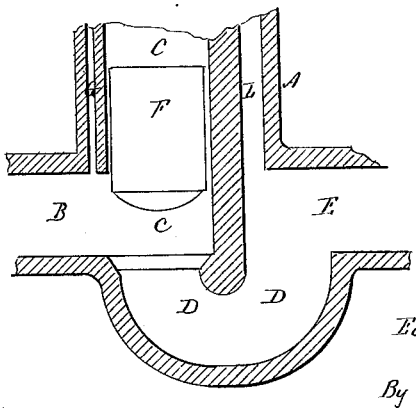
Witnesses,
Jos. C. Earle
A. J. Tibbits
Edme Augustus Chameroy
Inventor
By his Atty
John G. Earle 125,444

UNITED STATES PATENT OFFICE.

EDME AUGUSTIN CHAMEROY, OF PARIS, FRANCE.

IMPROVEMENT IN REGULATORS TO PROTECT PIPES FROM PERCUSSION.

Specification forming part of Letters Patent No. 126,444, dated May 7, 1872.

*To all whom may it concern:*

Be it known that I, EDME AUGUSTIN CHAMEROY, of Paris, France, have invented a new Improvement in Apparatus for Regulating the Pressure in Delivery-Pipes of Water, Gas, Steam, and other fluids; and I do hereby declare the following, when taken in connection with the accompanying drawing and the letters of reference marked thereon, to be a full, clear, and exact description of the same, and which said drawing constitutes part of this specification, and represents in—

Figure 1 a longitudinal section, and in Fig. 2 a modification of the same.

My invention relates to an improvement in apparatus for regulating the pressure in delivery-pipes of water, gas, steam, and other fluids; the object being to reduce the pressure in the service-pipes below that in the mains by introducing the regulator between the two.

It is well known that scarcely any strain is exerted upon the pipes when the fluids are flowing; but when shut off the pressure in the service-pipes is the same as in the mains. In the distribution of water and gas, and more particularly the distribution of water, in cities, it is important to diminish as much as possible the pressure in the pipes. Variable pressure increases to a great extent the liability to leakage, and increases or diminishes the discharge through the pipes in proportion as the pressure varies; and under great pressure the sudden cutting off of the water injures the pipes and causes them to leak. In order to obtain a constant pressure in the pipes it is necessary to limit it to the extent required. In the use of gas it is equally important to limit to a maximum the pressure of gas in all parts of the pipe, in order to prevent leakage and to regulate the consumption; also, in the employment of steam as a motive power, and for all other purposes, it is necessary to regulate the pressure.

My apparatus for regulating the pressure consists of a cock, A, secured to the pipe in which it is desired to regulate the pressure, under a constant charge of atmosphere, notwithstanding a greater pressure above the cock. The water, in its passage through the cock A, passes into a pipe, B, and raises the piston F in the chamber C, flows into the passage D, and out through the exit E. A small quantity of water flows into the passage G, then into the opening H of the valve I, thence up beneath the regulator J. When the pressure of the water in the passage E is lower than the atmosphere the function of the cock is manifested above this; but, if the supply of water below the cock is diminished or entirely suppressed, the pressure immediately rises to the atmosphere beneath the regulator J, raises the spring K, and at the same time closes the valve I. The water flowing into the passage G, not finding a passage through the opening H, forces the piston F upon its seat to stop all circulation of water between the passages B C D E. Therefore the pressure ceases to increase below the regulator, since there is no flow of water through either the passages B C D E or valve I. The pressure upward of the cock resumes its maximum, limited only by the height of water above the cock.

To make the operation clearer, suppose the water arrives by the tube B, and it is desired that it does not exceed a constant limit of pressure—two atmospheres, for example—to which pressure the tension of the spring K corresponds. The water passes at the same time through the pipe D after having lifted up the piston F, and in a small quantity through the aperture G of Fig. 1, or through the void or annular space G, which is reserved around the piston F in the tube C of Fig. 2, this annular space around the valve in Fig. 2 corresponding to the passage G in Fig. 1; then the water, which has been brought in through the aperture G, is conducted through the aperture H, which is around the clapper or valve I, under the regulator J, and comes down through the aperture L in the outlet-tube E, where it drains away with the stock of water which has passed freely through the tube D.

As long as the pressure of the water in the outlet-tube E will be lower than two atmospheres the course of the water will remain the same we have described; but if the draining out of the water becomes lower, and if in consequence the pressure exceeds two atmospheres under the regulator J, this pressure of the water, which cannot drain out, will raise the spring K, and at the same time drag away and close the valve I by the working of the spring M. Then the water, being unable to drain out through the aperture H, which is then closed by the valve I, pushes slowly the piston F against its lower seat away, and thus closes every circulation of water between the tubes B C D E. In consequence, the pressure will discontinue to increase downward on the regulator-tap, since there is no more draining out of water either through the tubes B C D E or through the clapper or valve I.

If the pressure downward of the regulator J becomes lower, the spring K will push the valve I away and open the aperture H. The piston F rising immediately up, the water will circulate through the tubes B C D E, as before. To completely close the cock A it is necessary to loosen the screw N so that the regulator K will not operate under any pressure. To obtain a continuous delivery under constant pressure from the pipe B, tighten the screw N so that the valve I will remain open.

This arrangement of regulator is applicable to all systems of tubular conductors, whether for water, gas, or steam—everywhere, in fact, where it is desired to avoid too great pressure or to render the pressure constant. This arrangement of regulator is equally applicable to engines and hydraulics to regulate the constant pressure maximum or minimum under which the machines operate.

I claim as my invention—

The fluid-regulator herein described, consisting of the inlet B and exit E, having the valve or piston F arranged in the chamber C, and the passage G leading from the inlet B above the piston, the opening H closed by the valve I, the regulator or diaphragm J with the pressure-spring above adjusted by the screw N, substantially in the manner and for the purpose set forth.

In testimony whereof I have signed my name to this specification before two subscribing witnesses.

E. A. CHAMEROY.

Witnesses:
  C. LAFOND,
  DUCROGNEL.